(12) United States Patent
Hevesi et al.

(10) Patent No.: US 9,709,717 B2
(45) Date of Patent: Jul. 18, 2017

(54) SOLAR CONTROL GLAZING

(75) Inventors: Kadosa Hevesi, Jumet (BE); Jan Sicha, Jumet (BE)

(73) Assignee: AGC Glass Europe, Brussels (BE)

( * ) Notice: Subject to any disclaimer, the term of this patent is extended or adjusted under 35 U.S.C. 154(b) by 636 days.

(21) Appl. No.: 13/696,882

(22) PCT Filed: May 25, 2011

(86) PCT No.: PCT/EP2011/058569
§ 371 (c)(1),
(2), (4) Date: Nov. 8, 2012

(87) PCT Pub. No.: WO2011/147875
PCT Pub. Date: Dec. 1, 2011

(65) Prior Publication Data
US 2013/0059137 A1 Mar. 7, 2013

(30) Foreign Application Priority Data

May 25, 2010 (BE) .................................. 2010/0311

(51) Int. Cl.
*G02B 5/20* (2006.01)
*C03C 17/36* (2006.01)
*G02B 5/08* (2006.01)
*B32B 17/10* (2006.01)

(52) U.S. Cl.
CPC ........ *G02B 5/208* (2013.01); *B32B 17/10036* (2013.01); *B32B 17/10229* (2013.01); *C03C 17/36* (2013.01); *C03C 17/366* (2013.01); *C03C 17/3613* (2013.01); *C03C 17/3626* (2013.01); *C03C 17/3639* (2013.01); *C03C 17/3644* (2013.01); *C03C 17/3652* (2013.01); *C03C 17/3681* (2013.01); *G02B 5/0858* (2013.01); *Y10T 428/2495* (2015.01)

(58) Field of Classification Search
CPC ........ B32B 17/10036; B32B 17/10229; C03C 17/36; Y10T 428/2495
USPC ....................................................... 428/220
See application file for complete search history.

(56) References Cited

U.S. PATENT DOCUMENTS

| | | | | |
|---|---|---|---|---|
| 5,595,825 A | * | 1/1997 | Guiselin | 428/428 |
| 5,652,046 A | * | 7/1997 | Beaufays | C03C 17/3435 |
| | | | | 359/360 |
| 7,572,511 B2 | * | 8/2009 | Hartig | C03C 17/36 |
| | | | | 428/428 |
| 2003/0143435 A1 | * | 7/2003 | Schicht | C03C 17/2453 |
| | | | | 428/697 |
| 2006/0210809 A1 | * | 9/2006 | Finley et al. | 428/432 |
| 2007/0082186 A1 | | 4/2007 | Hartig | |
| 2009/0233121 A1 | * | 9/2009 | Leconte | B32B 17/10 |
| | | | | 428/626 |
| 2009/0274901 A1 | * | 11/2009 | Roquiny | C03C 17/36 |
| | | | | 428/336 |
| 2011/0128617 A1 | | 6/2011 | Hartig | |

FOREIGN PATENT DOCUMENTS

| | | |
|---|---|---|
| EP | 0 645 352 | 3/1995 |
| JP | 02-111644 | 4/1990 |
| WO | 2009 029466 | 3/2009 |

OTHER PUBLICATIONS

U.S. Appl. No. 14/356,531, filed May 6, 2014, Hevesi.
U.S. Appl. No. 13/696,911, filed Nov. 11, 2012, Hevesi, et al.
International Search Report Issued Jul. 11, 2011 in PCT/EP11/058569 Filed May 25, 2011.

* cited by examiner

*Primary Examiner* — Aaron Austin
*Assistant Examiner* — Lawrence Ferguson
(74) *Attorney, Agent, or Firm* — Oblon, McClelland, Maier & Neustadt, L.L.P.

(57) ABSTRACT

The present invention relates to a substrate carrying a multilayer solar control stack, as well as to a multiple glazing incorporating at least one such sheet of glassy material carrying a solar control stack. The multilayer solar control stack comprises three functional layers based on a material which reflects infrared radiation and four dielectric coatings such that each functional layer is surrounded by dielectric coating. The geometrical thickness of the second functional layer starting from the substrate is less by at least 4% than the geometrical thicknesses of the first and third functional layers. The invention applies particularly to the formation of high-selectivity solar control glazings.

25 Claims, No Drawings

SOLAR CONTROL GLAZING

The present invention relates to a transparent substrate bearing a solar-control multilayer stack and also to a multiple glazing incorporating at least one such transparent substrate bearing a solar-control multilayer stack.

The solar-control stacks, also referred to as solar-protection stacks, to which the present invention relates, comprise functional layers that reflect infrared radiation, such as silver-based layers, combined with which are antireflection dielectric coatings which serve to reduce the light reflection and to control other properties of the stack such as the color, but which also serve as tie and protective coatings for the functional layers. The solar-control stacks commonly contain two functional layers surrounded by dielectric layers. More recently, stacks containing three functional layers have been proposed in order to further improve the solar protection while retaining the highest possible light transmission. Each functional layer is spaced out by at least one dielectric coating so that each functional layer is surrounded by dielectric coatings. The various layers of the stack are, for example, deposited by sputtering under reduced pressure enhanced by a magnetic field, in a well-known device of magnetron type. The present invention is not however limited to this particular layer deposition process.

These solar-control stacks are used in the production of solar-protection glazings, in order to reduce the risk of excessive overheating, for example of an enclosed space having large glazed surfaces, due to sunshine and thus to reduce the air-conditioning load to be accorded in summer. The transparent substrate then often consists of a sheet of glass, but it may also, for example, be formed of a plastic film such as a PET (polyethylene terephthalate) film which is then enclosed between two sheets of glass by means of an adhesive polymer film such as a PVB (polyvinyl butyral) or EVA (ethylene/vinyl acetate) film in order to form a laminated glazing, or enclosed on the inside of a multiple glazing.

In this case, the glazing must limit the total energetic solar radiation, that is to say that it must have a relatively low solar factor (FS or g). It must however guarantee the highest possible level of light transmission ($T_L$) so as to provide a satisfactory level of illumination inside the building. These somewhat conflicting requirements express the wish to obtain a glazing having a high selectivity (S), defined by the ratio of the light transmission to the solar factor. These solar-control stacks also have a low emissivity which makes it possible to reduce the loss of heat by a long-wavelength infrared radiation. They thus improve the thermal insulation of large glazed surfaces and reduce energy losses and heating costs in a cold period.

The light transmission ($T_L$) is the percentage of the incident light flux, of illuminant D65, transmitted by the glazing in the visible range. The solar factor (FS or g) is the percentage of incident energetic radiation which is, on the one hand, directly transmitted by the glazing and, on the other hand, absorbed by the latter then radiated in the direction opposite the source of energy with respect to the glazing.

These solar-protection glazings are in general assembled into multiple glazings such as double or triple glazings in which the sheet of glass bearing the stack is combined with one or more other glass sheets, which may or may not be provided with coating, the multilayer solar-control stack being in contact with the internal space between the glass sheets.

In certain cases, there is cause to carry out an operation for mechanically strengthening the glazing, such as a thermal toughening of the glass sheet or sheets, in order to improve the resistance to mechanical stresses. It is also optionally possible to be caused to give a more or less complex curvature to the glass sheets for particular applications, with the aid of a high-temperature bending operation. In the processes for manufacturing and forming the glazings, there are certain advantages in carrying out these heat treatment operations on the already coated substrate instead of coating an already treated substrate. These operations are carried out at a relatively high temperature, at which temperature the functional layer based on an infrared-reflecting material, for example based on silver, has a tendency to deteriorate and to lose its optical properties and its properties with respect to infrared radiation. These heat treatments especially consist in heating the glassy sheet at a temperature above 560° C. in air, for example between 560° C. and 700° C., and especially at around 640° C. to 670° C., for a duration of around 6, 8, 10, 12 or even 15 minutes depending on the type of treatment and the thickness of the sheet. In the case of a bending treatment, the glassy sheet may then be bent to the desired shape. The toughening treatment then consists in suddenly cooling the surface of the flat or curved glassy sheet with jets of air or coolant in order to obtain a mechanical strengthening of the sheet.

In the case where the coated glass sheet must undergo a heat treatment, it is therefore necessary to take very particular precautions in order to produce a stack structure which is capable of undergoing a toughening and/or bending heat treatment, sometimes referred to hereinbelow by the expression "toughenable", without losing its optical and/or energy properties which give it its essential purpose. It is especially necessary to use dielectric materials, in order to form dielectric coatings, which withstand the high temperatures of the heat treatment without exhibiting a damaging structural modification. Examples of materials that are particularly suitable for this use are mixed zinc-tin oxide, and especially zinc stannate, silicon nitride and aluminum nitride. It is also necessary to make sure that the functional layers, for example based on silver, are not oxidized during treatment, for example by ensuring that there are, at the time of the treatment, sacrificial layers capable of oxidizing instead of the silver by capturing free oxygen.

It is also desirable for the glazings to meet certain esthetic criteria in terms of light reflection ($R_L$), that is to say the percentage of the incident light flux—of the illuminant D65—reflected by the glazing in the visible range, and of color in reflection and in transmission. Market demand is for glazing with a light reflection that is moderate but not too low in order to avoid the "black hole" effect when looking at a facade under certain low light conditions. The combination of a high selectivity with a moderate light reflection sometimes leads to purple colors in reflection being obtained which are not very esthetic.

Solar-protection glazing is also used in the field of motor vehicle glazing, for example windshields but also other windows of the vehicle such as the side windows or rear windows. In this field, the windows are often laminated, that is to say that the substrate bearing the stack is combined with another transparent substrate, that may or may not bear a stack, by means of an adhesive plastic film generally made of PVB, the solar-protection stack being positioned on the inside of the laminate in contact with the PVB. Vehicle windows must generally be curved in order to adapt to the shape of the vehicle. When the substrate is a sheet of glass, the bending operation is carried out at a high temperature and the substrate equipped with its stack is hence subjected to a heat treatment similar to the toughening treatment, with or without rapid cooling, described above with, in addition, a forming operation while the substrate is at high temperature.

In order to reduce the amount of heat which enters the premises or the vehicle through the glazing, the invisible infrared heat radiation is prevented from passing through the glazing by reflecting it. This is the role of the functional layers based on a material that reflects infrared radiation. It is an essential element in the solar-control stack.

Several solutions have been proposed to improve solar protection while retaining the maximum light transmission, but no solution provides a truly satisfactory glazing.

Patent application WO 2009/029466 A1 in the name of PPG Industries describes a laminated glazing for a motor vehicle in which a glass sheet bears a stack having three silver-based functional layers. The silver layers have a decreasing thickness from the glass sheet which bears them. This document describes a stack having a high light transmission which may be used to form a motor vehicle windshield. However, the selectivity of this stack is relatively low.

Patent application EP 645352 A1 filed by Saint-Gobain Vitrage describes solar-protection glazing, the stack of which comprises three layers of silver having an increasing thickness starting from the glass. However, according to examples 1 and 2 of the document, either the selectivity is relatively low, or the color in reflection is not very stable and highly sensitive to fluctuations in the thicknesses during manufacture or to the lack of transverse uniformity.

One of the objects of the invention is to provide a transparent substrate bearing a solar-control multilayer stack which ensures effective solar protection with a high selectivity.

Another object of the invention is that the coated substrate has a pleasing appearance, both in transmission and in reflection on the substrate side, meeting commercial demand, for example in particular having a relatively neutral color.

Another object of the invention is to make it possible to more easily obtain a coated substrate that has a good angular stability of the color in reflection, that is to say it has a color variation of very low amplitude or of acceptable amplitude without major modification of the shade of the color.

Another object of the invention is to provide a coated substrate which has a low variation of the color in reflection observed on the substrate side when there is a fluctuation of the thicknesses of layers during the manufacturing time of a batch of coated substrates or a lack of transverse uniformity following a variable deposition rate over the length of the cathodes.

Another object of the invention is to provide a coated substrate that can easily be mass-produced on an industrial scale at an advantageous cost price.

The invention relates to a transparent substrate bearing a solar-control multilayer stack comprising three functional layers based on a material that reflects infrared radiation and four dielectric coatings so that each functional layer is surrounded by dielectric coatings, characterized in that the geometric thickness of the second functional layer starting from the substrate is at least 4% less than the geometric thicknesses of the first and third functional layers.

It has been found that this feature facilitates the easy obtaining of a coated substrate with a high solar-protection performance, that is to say with a high light transmission combined with a high selectivity, which has a pleasant and stable esthetic appearance. It has also been found that this feature, according to which the thickness of the first functional layer, and also the thickness of the third functional layer, is significantly (at least 4%) greater than the thickness of the second functional layer, makes it possible to more easily attain a value of b* in transmission of less than or equal to 4 and an angular variation, between 0° and 55° C., of a* in reflection on the substrate side of between −3.6 and 2. The color variations a* and b* according to the angle of observation may be relatively small. It is also observed that a high stability of the manufacturing tolerances can easily be attained when the coated substrate is examined in reflection on the substrate side.

This result is surprising because, given the interference complexity of a multilayer stack of this type, a relatively high variability of the colors observed in reflection on the substrate side with respect to a variation of the angle of observation and with respect to thickness fluctuations during production is typically expected.

The variation of the refractive index of the various materials, forming transparent dielectric coatings, according to the wavelength may be substantially different. Within the context of the present invention, the optical thickness of the dielectrics will be calculated using the following formula:

$$\text{optical thickness} = d \text{ multiplied by } n_v,$$

in which d is the geometric (physical) thickness of the layer in question and $n_v$ is a virtual refractive index obtained using the following formula:

$$n_v = (0.6902 \times n(550)^2) - (0.165 \times n(550)) - 0.4643$$

in which n(550) is the refractive index of the material at the wavelength of 550 nm.

If a dielectric coating is composed of several layers, the total optical thickness of the dielectric coating to be considered is the sum of the optical thicknesses of the various layers. When the barrier layer for protecting the functional layer is a sacrificial metal layer, this layer is in fact oxidized and converted to a transparent dielectric in the finished product. Since this layer is very thin it has little influence on the optical properties. However, if the multilayer stack must withstand a high-temperature heat treatment such as toughening and/or bending, this sacrificial metal layer is rendered thicker in order to form a sufficient oxidizable metallic reserve in order to protect the functional layer. Substantially the entire thickness of this layer is converted to oxide. In the various thickness ratio calculations according to the invention including dielectric coating thicknesses, the thickness of this oxidized sacrificial metal layer must be included in the total thickness of the dielectric coating in question if its physical thickness in oxidized form exceeds 2.5 nm, which corresponds to around 1.4 nm of metal as deposited for a barrier made of Ti. The ratio calculations do not thus take into account the thin barrier layer customarily used in the stacks which must not undergo high-temperature heat treatment. The thickness of the portion of the layer that has possibly remained in metallic form, which may in particular act as an absorbent layer, should not of course be included. If an outer protective layer made of sacrificial metal is used to protect the stack awaiting heat treatment and is oxidized by this treatment in the finished product, the thickness of the oxidized layer must be counted in the ratio calculations. The same is also true if the sacrificial metal is nitrided and forms a transparent dielectric.

In the present description, when geometric thicknesses of layers of a multilayer stack are given, or when reference is made to geometric thicknesses, they are firstly measured in a comprehensive manner on the coated substrate with the aid of an X-ray fluorescence (XRF) device with wavelength dispersive detection (WDS). This device is calibrated for each material on the basis of 5 to 10 coated samples of the material in question in known thicknesses, distributed between 2 and 300 nm, both as single layers and as layers inserted into various stacks. If a material is present as multiple layers in a stack, the total thickness of this material is deduced from an XRF analysis as described above then the distribution of the total thickness over each of the individual layers of the stack is allocated with the aid of a profiling measurement of the stack, for example with the aid of XPS profiling (X-ray photoelectron spectroscopy profiling with a profiling gun using argon ions in the energy range from 1 to 3 keV).

The stability of the color in a large-scale mass production is an important element for guaranteeing the manufacture of a product of consistent quality. For comparison purposes, the variation of the color in reflection following a fluctuation of the thicknesses of the layers has been quantified with the aid of a mathematical formula. The index of color variation in manufacture has been called "Deltacol" and has been defined by the following equation:

$$Deltacol = 0.5 \times \left( \sqrt{\frac{\Delta a*}{1.2}} + \sqrt{\frac{\Delta b*}{2.4}} \right)$$

in which $\Delta a*$ and $\Delta b*$ are the differences between the highest values and the lowest values respectively of $a*$ and of $b*$ found when the thicknesses of each silver layer and of each dielectric coating of the stack vary individually by plus or minus 2.5%. The values $a*$ and $b*$ are the CIELAB 1976 $L*a*b*$ values measured under the illuminant D65/10°.

Preferably, the geometric thickness of the second functional layer starting from the substrate is at least 8% less than the geometric thickness of the third functional layer.

Preferably, the geometric thickness of the second functional layer starting from the substrate is at least 8% less than the geometric thicknesses of the first and third functional layers.

Preferably, the geometric thickness of the second functional layer starting from the substrate is at least 15% less than the geometric thickness of the third functional layer.

Preferably, the ratio of the optical thickness of the third dielectric coating D3 positioned between the second and the third functional layers to the optical thickness of the final dielectric coating D4 positioned beyond the third functional layer starting from the substrate is less than 2.6, advantageously less than 2.2 and favorably less than 2. This ratio of D3 to D4 is preferably greater than 1.3 and advantageously greater than 1.4. This ratio is favorably between 1.3 and 2.6 and preferably between 1.5 and 2.1, particularly for obtaining a high light transmission.

Preferably, the ratio of the optical thickness of the third dielectric coating D3 positioned between the second and the third functional layers to the geometric thickness of the third functional layer starting from the substrate is between 5.5 and 10, advantageously between 6.6 and 9.3, and favorably between 7 and 9.

Preferably, the ratio of the optical thickness of the first dielectric coating D1 positioned between the substrate and the first functional layer to the optical thickness of the last dielectric coating positioned beyond the third functional layer is between 0.5 and 2.7, advantageously between 0.8 and 2.3, and favorably between 1.3 and 2.3. This ratio is favorably between 0.8 and 2, particularly for obtaining a high light transmission.

Preferably, the ratio of the optical thickness of the third dielectric coating D3 to the optical thickness of the second dielectric coating D2 positioned between the first functional layer starting from the substrate and the second functional layer is between 0.4 and 1.1, advantageously between 0.4 and 0.95, and favorably between 0.4 and 0.85.

Preferably, the ratio of the optical thickness of the second dielectric coating D2 to the optical thickness of the first dielectric coating D1 is between 1.15 and 3.4, preferably between 1.4 and 3.4 and advantageously between 1.4 and 2.8. This ratio is favorably between 1.6 and 2.1, particularly for obtaining a high light transmission.

Respecting these various ratios between the optical thicknesses of the dielectric coatings and/or the geometric thicknesses of the functional layers discussed above favors the obtaining of a solar-control stack having high energy performance, while retaining a relatively high light transmission, that has a pleasant and stable color and a high selectivity, very particularly when these ratios are all produced in combination. This stack may be easily mass produced in an industrial installation since it has a good color stability in a manufacturing tolerance that is easy to respect. It has been found that it is also possible to more easily obtain a level of reflection examined on the stack side that is lower and in particular less than 20%. In this way, the reflection inside premises, when the stack is placed at position 2 (position 1 conventionally being the outer face), is not too high so as not to restrict the vision through the coated substrate.

As has been stated above, the functional layers are advantageously formed from noble metal. They may be based on silver, gold, palladium, platinum or a mixture or alloy thereof, but also based on copper or aluminum, alone, as an alloy or as an alloy with one or more of the noble metals. Preferably, all the functional layers are based on silver. This is a noble metal which has a very high efficiency of reflection of infrared radiation. It is easily used in a magnetron device and its cost price is not prohibitive, in particular in respect to its efficiency. Advantageously, the silver is doped with a few percent of palladium, aluminum or copper, in a proportion, for example, of 1 to 10%, or it is possible to use a silver alloy.

Preferably, the color variation Deltacol (as defined above) in reflection looked at on the substrate side is less than 3.4, advantageously less than 3, preferably less than 2.6 and favorably less than 2.2. Thus a coated substrate is obtained, the appearance of which in reflection on the substrate side is not very sensitive to the vagaries of mass production on an industrial scale which may lead to fluctuations in the thicknesses of the layers during production.

Preferably, the color variation Deltacol in reflection looked at on the stack side is less than 6, advantageously less than 4, and favorably less than 2.8. In the same way, a coated substrate is thus obtained, the appearance of which in reflection on the stack side is not very sensitive to the vagaries of mass production on an industrial scale which may lead to fluctuations in the thicknesses of the layers during production.

Preferably, the variations of $a*$ in reflection on the substrate side, during a variation of the angle of observation of between 0 and 55°, are at most 3.5 as an absolute value, advantageously at most 2. This gives a particularly advantageous color stability, since the overall appearance of a facade varies little according to the angle of observation, for example according to the movement of the observer.

Preferably, the variations of b* in reflection on the substrate side, during a variation of the angle of observation of between 0 and 55°, are at most 5 as an absolute value, advantageously at most 4. This also gives a particularly advantageous color stability, in particular in combination with a nominal color having a blue tinge and the low variation of a*.

Preferably, the substrate bearing the stack has a selectivity of greater than 1.9, advantageously of greater than 1.94 and favorably of greater than 1.98 when the stack is deposited on a sheet of standard soda-lime clear float glass having a thickness of 6 mm and when this coated sheet is mounted as double glazing with another sheet of standard soda-lime clear float glass having a thickness of 4 mm that is uncoated.

Transparent dielectric coatings are well known in the field of layers deposited by sputtering. There are many suitable materials and it is pointless to make a complete list thereof here. They are in general oxides, oxynitrides or metallic nitrides. Among the most common, mention may be made, by way of example, of $SiO_2$, $TiO_2$, $SnO_2$, ZnO, ZnAlOx, $Si_3N_4$, AlN, $Al_2O_3$, $ZrO_2$, $Nb_2O_5$, YOx, TiZrYOx, TiNbOx, $HfO_x$, MgOx, TaOx, CrOx and $Bi_2O_3$ and mixtures thereof. Mention may also be made of the following materials: AZO, ZTO, GZO, NiCrOx, TXO, ZSO, TZO, TNO, TZSO, TZAO and TZAYO. The expression "AZO" relates to an aluminum-doped zinc oxide or to a mixed oxide of zinc and aluminum, preferably obtained from a ceramic cathode formed by the oxide to be deposited, either in a neutral or slightly oxidizing atmosphere. Similarly, the expressions ZTO or GZO relate respectively to mixed oxides of titanium and zinc or of zinc and gallium, obtained by ceramic cathodes, either in a neutral or slightly oxidizing atmosphere. The expression TXO relates to titanium oxide obtained from a ceramic cathode of titanium oxide. The expression ZSO relates to a zinc-tin mixed oxide obtained either from a metallic cathode of the alloy deposited under an oxidizing atmosphere or from a ceramic cathode of the corresponding oxide, either in a neutral or slightly oxidizing atmosphere. The expressions TZO, TNO, TZSO, TZAO or TZAYO relate respectively to titanium-zirconium, titanium-niobium, titanium-zirconium-tin, titanium-zirconium-aluminum or titanium-zirconium-aluminum-yttrium mixed oxides, obtained from ceramic cathodes, either in a neutral or slightly oxidizing atmosphere. All these materials cited above may be used for forming the transparent dielectric coatings used in the present invention.

Preferably, at least one of the dielectric coatings comprises at least one layer based on a zinc-tin mixed oxide containing at least 20% by weight of tin, for example around 50% in order to form $Zn_2SnO_4$. This oxide is very useful as a dielectric coating in a stack capable of undergoing a heat treatment.

Preferably, the lower dielectric coating positioned between the sheet of glassy material and the functional layer comprises at least one zinc-tin mixed oxide containing at least 20% by weight of tin, and the outer dielectric coating also comprises at least one zinc-tin mixed oxide containing at least 20% by weight of tin. This arrangement is very favorable for protecting the functional layer both with respect to oxidation originating from the outside and oxygen originating from the glassy material.

Preferably, the dielectric coating positioned under one or under each functional layer comprises a layer based on a zinc oxide that is optionally doped for example with aluminum or with gallium, in direct contact with the functional layer or layers. The zinc oxide may have a particularly favorable effect on the stability and corrosion resistance of the functional layer, especially when it is silver. It is also favorable to the improvement of the electrical conductivity of a silver-based layer, and therefore to obtaining a low emissivity, in particular during the heat treatment.

Advantageously, the dielectric coating positioned under each functional layer comprises a layer based on a zinc-tin mixed oxide having no more than around 20% by weight of tin and at least around 80% by weight of zinc, preferably no more than around 10% of tin and at least around 90% of zinc, in direct contact with the functional layer or layers. This mixed oxide having a high content of zinc oxide under and in direct contact with the functional layer, particularly when it is based on silver, is advantageous for the resistance of the functional layer to the high-temperature heat treatment of the toughening and/or bending type. The combination of this mixed oxide containing a high content of zinc under the functional layer with a zinc-tin mixed oxide containing at least 20% by weight of tin in the lower and outer dielectrics constitutes the most advantageous structure for the good resistance of the stack during a high-temperature heat treatment.

Preferably, the substrate is a sheet of standard soda-lime-silica glass. This is the substrate best suited for serving as a base for solar-control glazing. Preferably, the substrate is a sheet of extra-clear glass having a light transmission of greater than 90%, or even greater than or equal to 91%, and even greater than or equal to 92%. One particularly preferred substrate is the glass sold under the trade mark CLEARVISION® by the company AGC Glass Europe.

According to one advantageous embodiment, the stack comprises at least one absorbent layer so that, when the stack is deposited on a sheet of standard clear glass having a thickness of 6 mm, the total light absorption $A_L$ of the coated substrate measured on the substrate side is at least 25%, preferably at least 30% and advantageously at least 33%. The light transmission in single glazing as described is in this case less than or equal to 64%, preferably less than 61%. The absorbent layer may have a metallic nature as described in the patent application filed on the same day in the name of the applicant and entitled "Solar control glazing with low solar factor" or it may be formed of a dielectric material such as TiN, NbN, TaN or an absorbent oxide such as $WO_3$, $Fe_2O_3$, stainless steel oxide SSOx, or else an absorbent sub-stoichiometric form. It has been discovered that with the particular configuration of the functional layers according to the invention, the absorbent layer does not necessarily have to be positioned in the first and/or the last dielectric coating, which is advantageous from the point of view of the manufacturing process and allows a greater flexibility for developing the desired stack. Furthermore, the index of color variation Deltacol obtained is smaller than according to the prior art discussed above.

The invention extends to multiple glazing comprising at least one substrate bearing a solar-control multilayer stack as described above. The substrate is preferably a sheet of standard soda-lime glass, and advantageously an extra-clear glass having a light transmission of greater than 90% as discussed above, such as the glass sold under the trade mark CLEARVISION® by the company AGC Glass Europe. The invention provides a very useful solar-protection multiple glazing.

The coated substrate of the multilayer stack is preferably assembled as multiple glazing, for example as double or triple glazing, so that, when it is mounted on a building, the solar radiation firstly strikes the coated glass sheet on the side without the stack, then the stack, then the second glass sheet, and then optionally the third if it is triple glazing. The stack is therefore, according to the convention generally used, in position 2. It is in this position that the solar protection is the most effective.

Preferably, when the substrate bearing the multilayer stack is a sheet of 6 mm standard clear glass and when it is mounted as double glazing with a sheet of standard clear glass with no coating having a thickness of 4 mm, the double glazing thus formed has a solar factor of less than 39%, advantageously between 14 and 36% and favorably between 18 and 34%, a light transmission of between 30 and 72%, advantageously between 38 and 69% and favorably between 45 and 64%, an external light reflection, therefore on the glass side of the coated glass sheet, of between 7 and 25%, preferably between 11 and 19%, with a bluish color in external reflection characterized by a value of b* of less than or equal to a*, with preferably a*>−5, and advantageously between −1 and −3. The angular variation of the value a* of the color in external light reflection between 0° and 55° is preferably between −3.6 and 2. The color in transmission is preferably characterized by a value of b* of less than or equal to 4, advantageously less than or equal to 3.

According to one preferred embodiment, when the substrate bearing the multilayer stack is a 6 mm sheet of standard clear glass and when it is mounted as double glazing with a sheet of standard clear glass having a thickness of 4 mm that is uncoated, the double glazing thus formed has a solar factor between 25 and 34%, advantageously between 27 and 31%, and a light transmission of greater than 55%, advantageously between 57 and 72%. It is thus possible to obtain a transparent glazing that forms an effective solar-protection screen combined with a high light transmission.

According to another preferred embodiment, when the substrate bearing the multilayer stack is a 6 mm sheet of standard clear glass and when it is mounted as double glazing with a sheet of standard clear glass having a thickness of 4 mm that is uncoated, the double glazing thus formed has a solar factor between 18 and 27%, advantageously between 21 and 26%, and a light transmission between 35 and 55%, advantageously between 40 and 52%. It is thus possible to obtain a transparent glazing that forms a highly effective solar-protection screen that is particularly suitable for very sunny regions.

The invention also extends to a laminated glazing comprising at least one transparent substrate as described above joined to a sheet of glassy material by means of an adhesive plastic. Such glazing is advantageously used as glazing for a motor vehicle.

The invention will now be described in greater detail, in a non-limiting manner, with the aid of the preferred exemplary embodiments below.

EXAMPLES

Example 1

A 3.2 m by 1 m sheet of standard soda-lime clear float glass having a thickness of 6 mm is placed in a sputtering device, enhanced by a magnetic field, at reduced pressure (around 0.3 Pa) of the magnetron type. On this glass sheet a multilayer solar-control stack is deposited which comprises, in sequence:

A first dielectric coating is deposited on the glass sheet. This first coating is formed of two layers of zinc-tin mixed oxides deposited in a reactive atmosphere consisting of a mixture of argon and oxygen, from cathodes of zinc-tin alloys of different compositions. The first zinc-tin mixed oxide is formed from cathodes of a zinc-tin alloy containing 52% by weight of zinc and 48% by weight of tin in order to form the spinel structure of zinc stannate $Zn_2SnO_4$. The second zinc-tin mixed oxide $ZnSnO_x$, having a geometric thickness of around 9.2 nm, is deposited from targets of a zinc-tin alloy containing 90% by weight of zinc and 10% by weight of tin. The thickness of the first layer of zinc-tin mixed oxides is the balance with respect to the thickness of the second layer in order to achieve the geometric thickness corresponding to the optical thickness of the first dielectric coating D1 indicated in table 1 below.

An infrared-reflecting IR1 functional layer formed of silver from a target of practically pure silver in a neutral atmosphere of argon is then deposited on the first dielectric coating D1. The geometric thickness of this layer IR1 is given in table 1.

A protective layer of 1.4 nm of sacrificial metal Ti is deposited from a titanium target in a neutral atmosphere directly onto the silver layer that has a common interface with it. The oxidizing atmosphere of the plasma during the deposition of the following layer, described hereinbelow, will oxidize this sacrificial layer of titanium. For a stack intended to undergo a toughening, bending and/or hardening treatment (which hardening treatment is a toughening treatment in which the rapid cooling is less pronounced), from 2.6 to 3.2 nm of titanium would be deposited under the same conditions. The thickness of the protective layer converted to oxide which exceeds 2.5 nm (value corresponding as oxide to 1.4 nm of geometric thickness of Ti of the protective layer as deposited in the case of a non-toughenable stack) will have to be added to the thickness of the dielectric coating which follows for the calculation of the ratios according to the invention.

Similarly, the following layers are then deposited on the protective layer:

A second dielectric coating D2, a second functional layer IR2, a sacrificial of Ti of 1.4 nm, a third dielectric coating D3, a third functional layer IR3, a sacrificial layer of Ti of 1.4 nm, followed by a fourth and last dielectric coating D4. This fourth dielectric coating D4 is formed of two layers of zinc-tin mixed oxides deposited in a reactive atmosphere constituted of a mixture of argon and oxygen from cathodes of zinc-tin alloys of different compositions. The first zinc-tin mixed oxide $ZnSnO_x$, having a geometric thickness of around 8 nm, is deposited from targets of a zinc-tin alloy containing 90% by weight of zinc and 10% by weight of tin, referred to hereinbelow as ZSO9. The second zinc-tin mixed oxide is formed from cathodes of a zinc-tin alloy containing 52% by weight of zinc and 48% by weight of tin in order to form the spinel structure of zinc stannate $Zn_2SnO_4$, referred to hereinbelow as ZSO5. The thickness of this second layer of zinc-tin mixed oxides is the balance with respect to the thickness of the first layer to attain the geometric thickness corresponding to the optical thickness of the fourth dielectric coating D4 indicated in table 1 below.

The second and third infrared-reflecting functional layers, IR2 and IR3, are formed of silver from a target of practically pure silver sputtered in a neutral atmosphere of argon, in the same way as the layer IR1.

The second and third dielectric coatings, respectively D2 and D3, are each respectively formed of two layers of zinc-tin mixed oxides deposited in a reactive atmosphere constituted of a mixture of argon and oxygen from cathodes of zinc-tin alloys of different compositions. The first zinc-tin mixed oxide of each of these two dielectric coatings is formed from cathodes of a zinc-tin alloy containing 52% by weight of zinc and 48% by weight of tin in order to form the spinel structure of zinc stannate $Zn_2SnO_4$. The second zinc-tin mixed oxide $ZnSnO_x$, of each of these two dielectric coatings, having a geometric thickness of around 16 nm, is deposited from targets of a zinc-tin alloy containing 90% by weight of zinc and 10% by weight of tin. The thickness of the first layer of zinc-tin mixed oxides of each of these two coatings is the balance with respect to the thickness of the second layer of each of these two coatings in order to achieve the geometric thickness corresponding respectively to the optical thicknesses of the second and third dielectric coatings D2 and D3 indicated in table 1 below.

In table 1, the values of the various ratios of thicknesses of the dielectric coatings and functional layers discussed above have also been indicated. As discussed above, these ratios are calculated without taking into account the thickness of the protective sacrificial metal layers, each having 1.4 nm of Ti.

This coated glass sheet is then assembled as double glazing with another 4 mm sheet of clear glass, the coating being positioned on the side of the space inside the double glazing. The space between the two sheets is 15 mm and 90% of the air therein is replaced with argon. By observing the double glazing on the glass side of the coated substrate, the stack being placed at position 2, that is to say that firstly the glazing provided with the stack observed on the glass side, then the sheet of clear glass without layer are observed, the optical and thermal properties indicated in table 2 are noted. In the present invention, the following conventions are used for the measured or calculated values. The light transmission ($T_L$), the light reflection ($R_L$), the light absorption ($A_L$) (percentage of light flux—of illuminant D65/2°—absorbed by the glazing in the visible range) are measured with illuminant D65/2°. As regards the color in reflection and the color in transmission, the CIELAB 1976 (L*a*b*) values are measured with illuminant D65/10°. The solar factor (FS or g) is calculated according to the EN410 standard.

In table 2, the values of selectivity (S) and of Deltacol are also indicated, and also the values of the variations of a* and b* in reflection on the substrate side during a variation of the angle of observation between 0 and 55°, respectively referred to as "Shift a*" and "Shift b*". Deltacol ($R_V$) means that the index of variation is obtained in reflection on the substrate side, whilst Deltacol ($R_C$) means that the index of variation is obtained on the stack side. For the values of colors, "($T_L$)" means that the value is measured in transmission, "($R_C$)" means that the value is measured in reflection on the stack (layer) side and "($R_V$)" means that the value is measured in reflection on the substrate (glass) side. Column $A_E$ of table 2 takes up the energy absorption values of the coated substrate as a simple sheet, calculated according to the EN410 standard. The refractive index n(550), at the wavelength of 550 nm, of the dielectric materials ZSO5 and ZSO9 is 2.03.

It is observed that the colors in reflection obtained are agreeable and correspond to commercial demand. The level of reflection on the substrate side is not too low, which avoids the "black hole" while avoiding the mirror effect. The angular variations of color are low and perfectly acceptable, and the manufacturing stability is particularly good.

As a variant, the zinc-tin mixed oxide of the various dielectric coatings was replaced by one of the following series of layers for D1, D2 and/or D3: $TiO_2$/ZnO:Al or TZO/$TiO_2$/ZnO or $SnO_2$/ZnO/$SnO_2$/ZnO or ZnO:Al/ZSO5/ZnO, by one of the following series for D1: $Si_3N_4$/ZnO or AlN/ZnO, and one of the following series for D4: ZnO/$SnO_2$ or ZnO/TZO or ZnO:Al/ZSO5 or ZnO/$SnO_2$/$Si_3N_4$ or ZnO/$SnO_2$/AlN, optionally with an outer protective layer. Each time, the geometric thicknesses of the various constituents were adapted as a function of their virtual refractive index (as described above) in order to obtain the optical thickness of the corresponding dielectric coating as indicated in table 1. The actual refractive indices n(550), at the wavelength of 550 nm, of the dielectric materials used are the following: for $TiO_2$, n(550)=2.5; for $Si_3N_4$, n(550)=2.04; for $Al_2O_3$, n(550)=1.8; for ZSO5 and ZSO9, n(550)=2.03; for AlN, n(550)=1.9; and for TZO, n(550)=2.26. Substantially the same properties were obtained.

As a variant, the protective layers deposited directly onto the silver layers IR1, IR2 and/or IR3 are thin layers of 2 nm of TiOx or ZnOx optionally doped with aluminum, deposited in a neutral atmosphere from ceramic cathodes respectively of optionally doped titanium oxide or zinc oxide. When the three protective layers are thus formed by TiOx deposited from a ceramic cathode, the gain in light transmission TL is 8% as monolithic sheet with respect to a protective layer formed of a Ti sacrificial metal oxidized by the process for depositing, in an oxidizing atmosphere, the following dielectric coating. When the three protective layers are thus formed by ZnO:Al (2% by weight of aluminum) deposited from a ceramic cathode, the gain in light transmission TL is 3% as monolithic sheet with respect to a protective layer formed of a Ti sacrificial metal oxidized by the process for depositing, in an oxidizing atmosphere, the following dielectric coating.

According to yet other variants, in the transparent dielectric coating D4, the sequence of zinc-tin mixed oxides was replaced by the sequence ZnO:Al/$TiO_2$ or TZO, by the sequence ZnO:Al/$SnO_2$/$TiO_2$ or TZO, or else by the sequence ZnO:Al/ZSO5/$TiO_2$ or TZO.

Examples 2 to 6

Examples 2 to 6 were carried out in the same manner, according to the same structures and with the same materials as example 1. In these examples however, the optical thicknesses of the various coatings and the geometric thicknesses of the various functional layers were modified according to the indications of table 1. As regards the dielectric coatings, the same principle as in example 1 was used, that is to say that they are formed of two layers, one of the layers of which has a fixed thickness and the other layer has a complementary thickness in order to obtain the optical thickness indicated in the table.

Comparative Example 1

Comparative example 1 (Comp. 1), listed in tables 1 and 2, shows a stack outside of the invention and has been implemented according to the structure described by patent application WO 2009/029466 A1.

In this comparative example, the dielectric coating D1 consists of 30.7 nm of zinc stannate and 8 nm of ZnO, the dielectric coatings D2 and D3 are formed respectively of 58.6 nm and of 54.8 nm of zinc stannate each surrounded by 8 nm of ZnO on each side, and D4 is formed of 8 nm of ZnO followed by 24.6 nm of zinc stannate and 4 nm of $TiO_2$. The three functional layers are formed of silver. A sacrificial layer of Ti giving rise to 2 nm of $TiO_2$ in the finished product is deposited on each silver layer. The substrate is made of standard soda-lime glass.

It is especially observed that the selectivity is very low.

Examples 7 to 12

Examples 7 to 12 were carried out in the same manner, according to the same structures and with the same materials as example 1 and relate to the second embodiment of the invention. In these examples, the protective layers made of sacrificial metal Ti, deposited on the first functional layer IR1 for examples 7 to 9 and 11, or onto the three functional layers IR1, IR2 and IR3 for example 10, are intended to form, at the same time, absorbent layers Abs1, Abs2 and Abs3 in the finished product. The oxidizing atmosphere of the plasma during the deposition of the following layer will partially oxidize this sacrificial layer of titanium. The geometric thickness of the layer of Ti as deposited is sufficient so that there remains in the finished product some Ti of metallic nature which forms the absorbent layer Abs1, Abs2 or Abs3 having the thickness specified in table 1.

As a variant, it is also possible to additionally deposit, directly onto the silver layer before depositing the absorbent layer, a thin layer of 1 to 2 nm of TiOx or ZnOx optionally doped with aluminum, in a neutral atmosphere from a ceramic cathode respectively of optionally doped titanium oxide or zinc oxide.

The corresponding properties are given in table 2.

Examples 13 to 15

Examples 13 to 15 were carried out in the same manner, according to the same structures and with the same materials as example 1, except for what is specified below, and relate to the second embodiment of the invention. In these examples, a light-absorbing layer was deposited on top of the first functional layer IR1.

In example 13, a TiN light-absorbing layer having a geometric thickness of 5.7 nm was deposited directly onto the first silver layer IR1 by sputtering in a nitrogen atmosphere from a titanium metal target. Next, the protective layer of sacrificial Ti having a geometric thickness of 1.4 nm was deposited.

In example 14, a protective layer of TiOx having a geometric thickness of 2.4 nm was deposited, in a neutral atmosphere from a ceramic cathode of titanium oxide, directly onto the first silver layer IR1. Next, a TiN light-absorbing layer having a geometric thickness of 5.7 nm, enclosed between two $Si_3N_4$ layers having an optical thickness of 23.6 nm, was deposited by sputtering in a nitrogen atmosphere from titanium metal and aluminum-doped silicon targets. The structure directly after IR1 is hence the following: $IR1/Ti/Si_3N_4/TiN/Si_3N_4/ZSO5/ZSO9/IR2$. In table 1, the value of 57 Å for the absorbent layer has been placed between parentheses in the column Abs1 in order to signify that this layer is not in fact in the correct location in the sequence of the actual structure, since the absorbent layer is in reality enclosed between two $Si_3N_4$ layers. The total optical thickness indicated for the dielectric coating D2 takes into account the thickness of the two $Si_3N_4$ layers as well as the thickness of the ZSO5 and ZSO9 layers.

Example 15 has the same structure as example 14, except that the light-absorbing layer is here a layer of Pd having a geometric thickness of 1.2 nm, also enclosed between two $Si_3N_4$ layers 23.6 nm each.

The properties of these examples are indicated in table 2.

TABLE 1

| Example | D1 (Å) | IR1 (Å) | Abs1 (Å) | D2 (Å) | IR2 (Å) | Abs2 (Å) | D3 (Å) | IR3 (Å) | Abs3 (Å) | D4 (Å) | D1/D4 | D3/D2 | IR3/IR2 | D3/D4 | D3/IR3 | D2/D1 |
|---|---|---|---|---|---|---|---|---|---|---|---|---|---|---|---|---|
| 1 | 886 | 139 | — | 1601 | 111 | — | 997.9 | 129 | — | 511 | 1.73 | 0.62 | 1.16 | 1.95 | 7.73 | 1.81 |
| 2 | 908 | 132 | — | 1605 | 120 | — | 1125 | 148 | — | 564 | 1.61 | 0.70 | 1.23 | 2.00 | 7.63 | 1.77 |
| 3 | 974 | 136 | — | 1644 | 115 | — | 1040 | 142 | — | 540 | 1.80 | 0.63 | 1.24 | 1.93 | 7.31 | 1.69 |
| 4 | 837 | 135 | — | 1669 | 119 | — | 950.4 | 131 | — | 511 | 1.64 | 0.57 | 1.10 | 1.86 | 7.25 | 1.99 |
| 5 | 649 | 80 | — | 1153 | 64.8 | — | 1253 | 217 | — | 786 | 0.83 | 1.09 | 3.36 | 1.59 | 5.76 | 1.78 |
| 6 | 908 | 132 | — | 1605 | 120 | — | 1125 | 148 | — | 564 | 1.61 | 0.70 | 1.23 | 2.00 | 7.63 | 1.77 |
| Comp. 1 | 786 | 97.2 | — | 1514 | 106 | — | 1437 | 80 | — | 799 | 0.98 | 0.95 | 0.76 | 1.80 | 17.90 | 1.93 |
| 7 | 666 | 148 | 27 | 1345 | 64.8 | — | 840.5 | 126 | — | 617 | 1.08 | 0.63 | 1.94 | 1.36 | 6.67 | 2.02 |
| 8 | 664 | 161 | 23 | 1459 | 82 | — | 758.1 | 108 | — | 540 | 1.23 | 0.52 | 1.32 | 1.40 | 6.99 | 2.20 |
| 9 | 786 | 157 | 23 | 1489 | 95 | — | 768 | 102 | — | 489 | 1.61 | 0.52 | 1.07 | 1.57 | 7.51 | 1.89 |
| 10 | 966 | 123 | 12 | 1525 | 116 | 4 | 1093 | 128 | 9 | 481 | 2.01 | 0.72 | 1.10 | 2.27 | 8.54 | 1.58 |
| 11 | 1052 | 150 | 19 | 1468 | 108 | — | 953 | 118 | — | 485 | 2.17 | 0.65 | 1.09 | 1.96 | 8.10 | 1.40 |
| 12 | 871 | 159 | 27 | 1532 | 95 | — | 749 | 99 | — | 496 | 1.76 | 0.49 | 1.04 | 1.51 | 7.55 | 1.76 |
| 13 | 663 | 161 | 57 | 1491 | 82 | — | 758 | 108 | — | 540 | 1.23 | 0.51 | 1.32 | 1.40 | 6.99 | 2.25 |
| 14 | 663 | 157 | (57) | 1460 | 82 | — | 778 | 108 | — | 540 | 1.23 | 0.53 | 1.32 | 1.44 | 7.18 | 2.20 |
| 15 | 663 | 161 | (15) | 1460 | 93 | — | 778 | 112 | — | 540 | 1.23 | 0.53 | 1.20 | 1.44 | 6.98 | 2.20 |

TABLE 2

| Example | S | $A_E$ % | g % | $T_L$ % | a* $(T_L)$ | b* $(T_L)$ | L* $(R_C)$ | a* $(R_C)$ | b* $(R_C)$ | L* $(R_V)$ | a* $(R_V)$ | b* $(R_V)$ | Shift a* | Shift b* | Deltacol $(R_V)$ | Deltacol $(R_C)$ |
|---|---|---|---|---|---|---|---|---|---|---|---|---|---|---|---|---|
| 1 | 1.99 | 33 | 30 | 59.8 | −5.3 | 2.9 | 46.7 | −0.6 | 1.1 | 43.1 | −4.8 | −10.1 | −0.4 | 3.4 | 1.8 | 2.1 |
| 2 | 2 | 34 | 29.7 | 59.5 | −5.8 | 1.8 | 46.5 | 2.7 | 1.2 | 42.9 | −4.5 | −7.7 | −0.5 | 4.6 | 1.7 | 2.1 |
| 3 | 2 | 34 | 29.2 | 58.4 | −5.5 | 3.3 | 48.6 | 1.1 | 0.9 | 45.1 | −5.3 | −10.5 | −0.8 | 4.8 | 1.7 | 2.3 |
| 4 | 1.99 | 33 | 29.3 | 58.3 | −5.5 | 3.2 | 48.6 | 2.2 | 1.5 | 45.6 | −4.9 | −10.2 | −0.9 | 3.8 | 1.7 | 2.2 |
| 5 | 1.98 | 36 | 27.7 | 54.8 | −7.5 | 3.8 | 53.5 | 7.7 | −3.3 | 49.2 | −3.0 | −7.3 | 1.7 | 2.0 | 1.7 | 2.1 |
| 6 | 2 | 33.7 | 29.7 | 59.5 | −5.8 | 1.8 | 46.5 | 2.6 | 1.2 | 43.0 | −4.6 | −7.6 | −0.7 | 4.6 | 1.7 | 2.0 |
| Comp. 1 | 1.72 | 33.2 | 38.5 | 66.1 | −3.9 | 2.5 | 41.9 | 0.3 | −4.9 | 39.1 | −2.0 | −3.4 | 1.9 | 2.4 | | |
| 7 | 1.92 | 41 | 24.5 | 47.0 | −6.7 | 1.5 | 41.9 | −3.2 | −7.0 | 50.1 | −4.8 | −9.7 | −3.2 | 0.0 | 2.5 | 4.4 |
| 8 | 1.95 | 39 | 24.5 | 47.7 | −6.5 | 1.1 | 43.4 | −6.6 | −3.2 | 50.7 | −4.5 | −9.3 | −2.2 | −0.2 | 2.4 | 3.3 |
| 9 | 1.97 | 40 | 24.8 | 48.9 | −7.0 | 1.0 | 42.7 | −5.6 | −1.8 | 47.6 | −4.6 | −10.9 | −0.9 | 0.0 | 2.2 | 2.6 |
| 10 | 1.94 | 44 | 24.8 | 48.0 | −7.8 | −1.0 | 43.4 | −0.2 | 5.2 | 38.2 | −4.9 | −11.1 | 0.6 | 3.4 | 2.2 | 1.7 |
| 11 | 2.03 | 40 | 25.1 | 50.8 | −7.5 | 2.2 | 43.4 | −4.6 | −1.7 | 44.6 | −5.0 | −14.1 | 1.1 | 1.5 | 2.5 | 3.8 |

TABLE 2-continued

| Example | S | $A_E$ % | g % | $T_L$ % | a* ($T_L$) | b* ($T_L$) | L* ($R_C$) | a* ($R_C$) | b* ($R_C$) | L* ($R_V$) | a* ($R_V$) | b* ($R_V$) | Shift a* | Shift b* | Deltacol ($R_V$) | Deltacol ($R_C$) |
|---|---|---|---|---|---|---|---|---|---|---|---|---|---|---|---|---|
| 12 | 1.97 | 40 | 24.3 | 47.9 | −7.2 | 2.7 | 42.9 | −5.2 | −4.5 | 49.1 | −3.5 | −13.9 | −3.6 | 1.8 | 2.2 | 2.7 |
| 13 | 1.99 | 34.6 | 25 | 49.6 | −5.3 | 2.9 | 47.2 | −9.3 | −1.7 | 53.4 | −4.8 | −8.3 | −2.9 | 1.3 | | |
| 14 | 1.99 | 35.3 | 24.2 | 48.0 | −6.6 | 1.1 | 44.2 | −7.0 | −2.0 | 52.4 | −1.8 | −6.6 | −1.4 | 1.4 | | |
| 15 | 1.93 | 37.6 | 25.1 | 48.4 | −5.3 | 3.2 | 41.7 | 0.5 | −2.9 | 48.4 | −6.9 | −13.5 | −2.2 | 1.2 | | |

The invention claimed is:

1. A transparent substrate comprising a solar-control multilayer stack, said solar control stack comprising in sequence starting from the substrate:
   a first dielectric layer;
   a first functional layer comprising a material that reflects infrared radiation;
   a second dielectric layer;
   a second functional layer comprising a material that reflects infrared radiation;
   a third dielectric layer;
   a third functional layer comprising a material that reflects infrared radiation; and
   a fourth dielectric layer,
   wherein a geometric thickness of the second functional layer starting from the substrate is at least 4% less than geometric thicknesses of the first and third functional layers,
   wherein the functional layers comprise a material selected from the group consisting of silver, gold, palladium, platinum, aluminum, copper, and mixtures and alloys thereof, and
   wherein the first functional layer has a thickness of 80 Å to 161 Å, the second functional layer has a thickness of 64.8 Å to 120 Å, and the third functional layer has a thickness of 80 Å to 217 Å.

2. The transparent substrate of claim 1, wherein the geometric thickness of the second functional layer starting from the substrate is at least 8% less than the geometric thickness of the third functional layer.

3. The transparent substrate of claim 1, wherein the geometric thickness of the second functional layer starting from the substrate is at least 8% less than the geometric thicknesses of the first and third functional layers.

4. The transparent substrate of claim 1, wherein the geometric thickness of the second functional layer starting from the substrate is at least 15% less than the geometric thickness of the third functional layer.

5. The transparent substrate of claim 1, wherein the ratio of the optical thickness of the dielectric coating positioned between the second and the third functional layers to the optical thickness of the final dielectric coating positioned beyond the third functional layer starting from the substrate is between 1.3 and 2.6.

6. The transparent substrate of claim 5, wherein the ratio of the optical thickness of the dielectric coating positioned between the second and the third functional layers to the optical thickness of the final dielectric coating positioned beyond the third functional layer starting from the substrate is between 1.5 and 2.1.

7. The transparent substrate of claim 1, wherein the ratio of the optical thickness of the dielectric coating positioned between the second and third functional layer to the geometric thickness of the third functional layer starting from the substrate is between 5.5 and 10.

8. The transparent substrate of claim 1, wherein the ratio of the optical thickness of the dielectric coating positioned between the substrate and the first functional layer to the optical thickness of the last dielectric coating positioned beyond the third functional layer is between 0.5 and 2.7.

9. The transparent substrate of claim 8, wherein the ratio of the optical thickness of the dielectric coating positioned between the substrate and the first functional layer to the optical thickness of the last dielectric coating positioned beyond the third functional layer is between 0.8 and 2.

10. The transparent substrate of claim 1, wherein the ratio of the optical thickness of the third dielectric coating D3 to the optical thickness of the second dielectric coating D2 positioned between the first functional layer starting from the substrate and the second functional layer is between 0.4 and 1.1.

11. The transparent substrate of claim 1, wherein the ratio of the optical thickness of the second dielectric coating D2 to the optical thickness of the first dielectric coating D1 is between 1.15 and 3.4.

12. The transparent substrate of claim 1, wherein the stack comprises an absorbent layer such that, when the stack is deposited on a sheet of standard clear glass having a thickness of 6 mm, the total light absorption $A_L$ of the glass bearing the stack, measured on the substrate side, is at least 25%.

13. A multiple glazing, comprising:
   the transparent substrate of claim 1.

14. A laminated glazing, comprising:
   the transparent substrate of claim 1 joined to a sheet comprising a glassy material with an adhesive plastic.

15. The transparent substrate of claim 1, wherein the ratio of the optical thickness of the dielectric coating positioned between the second and third functional layer to the geometric thickness of the third functional layer starting from the substrate is between 7 and 9.

16. The transparent substrate of claim 1, wherein the ratio of the optical thickness of the dielectric coating positioned between the substrate and the first functional layer to the optical thickness of the last dielectric coating positioned beyond the third functional layer is between 1.3 and 2.3.

17. The transparent substrate of claim 1, wherein the ratio of the optical thickness of the second dielectric coating D2 to the optical thickness of the first dielectric coating D1 is between 1.6 and 2.1.

18. The transparent substrate of claim 1, wherein the stack comprises an absorbent layer such that, when the stack is deposited on a sheet of standard clear glass having a thickness of 6 mm, the total light absorption $A_L$ of the glass bearing the stack, measured on the substrate side, is at least 30%.

19. The transparent substrate of claim 1, wherein the stack comprises an absorbent layer such that, when the stack is deposited on a sheet of standard clear glass having a thickness of 6 mm, the total light absorption $A_L$ of the glass bearing the stack, measured on the substrate side, is at least 33%.

20. A multiple glazing comprising a transparent substrate, the transparent substrate further comprising a solar-control multilayer stack comprising in sequence starting from the substrate:
- a first dielectric layer;
- a first functional layer comprising a material that reflects infrared radiation;
- a second dielectric layer;
- a second functional layer comprising a material that reflects infrared radiation;
- a third dielectric layer;
- a third functional layer comprising a material that reflects infrared radiation; and
- a fourth dielectric layer,
- wherein the geometric thickness of the second functional layer starting from the substrate is at least 4% less than the geometric thicknesses of the first and third functional layers, and
- wherein the multiple glazing has
  - a solar factor between 14 and 36%;
  - a light transmission between 38 and 69%;
  - an external light reflection, on the glass side of the coated glass sheet, between 7 and 25%; and
  - a color in external reflection for which the value b* is less than or equal to a* and for which the angular variation of a* between 0° and 55° is between −3.6 and 2.

21. A transparent coated substrate, comprising in order starting from the coated substrate:
- a first dielectric layer;
- a first functional layer;
- a second dielectric layer;
- a second functional layer;
- a third dielectric layer;
- a third functional layer; and
- a fourth dielectric layer;
- wherein a geometric thickness of the second functional layer is at least 4% less than geometric thicknesses of the first and third functional layers,
- wherein the functional layers comprise silver, and
- wherein the first functional layer has a thickness of 80 Å to 161 Å, the second functional layer has a thickness of 64.8 Å to 120 Å, and the third functional layer has a thickness of 80 Å to 217 Å.

22. The transparent substrate of claim 20, wherein the functional layers comprise silver.

23. The transparent substrate of claim 1, wherein every functional layer in the solar control stack is separated from every other functional layer by one or more dielectric layers.

24. The transparent substrate of claim 1, wherein the substrate comprising the stack has a selectivity of greater than 1.9 when the stack is deposited on a sheet of standard soda-lime clear float glass having a thickness of 6 mm and when the coated sheet is mounted as a double glazing with another sheet of standard soda-lime clear float glass having a thickness of 4 mm that is uncoated.

25. The transparent substrate of claim 20, wherein the substrate comprising the stack has a selectivity of greater than 1.9 when the stack is deposited on a sheet of standard soda-lime clear float glass having a thickness of 6 mm and when the coated sheet is mounted as a double glazing with another sheet of standard soda-lime clear float glass having a thickness of 4 mm that is uncoated.

* * * * *